United States Patent [19]
Dietzsch

[11] Patent Number: 4,809,843
[45] Date of Patent: Mar. 7, 1989

[54] VIBRATORY CONVEYOR

[75] Inventor: Claudius R. Dietzsch, Stein am Rhein, Switzerland

[73] Assignee: Sig Schweizerische Industrie-Gesellschaft, Neuhausen am Rheinfall, Switzerland

[21] Appl. No.: 163,316

[22] Filed: Mar. 2, 1988

[30] Foreign Application Priority Data

Mar. 5, 1987 [CH] Switzerland ............................ 818/87

[51] Int. Cl.$^4$ ............................................ B65G 27/08
[52] U.S. Cl. ..................................... 198/771; 198/752
[58] Field of Search ........ 198/771, 752, 759, 760–763, 198/766, 767, 750; 193/2 B

[56] References Cited

U.S. PATENT DOCUMENTS

| 3,087,603 | 4/1963 | Petrea | 198/763 |
| 3,605,996 | 9/1971 | Holman | 198/763 X |
| 3,703,233 | 11/1972 | Hacker | 198/763 |
| 4,462,522 | 7/1984 | Fluck | 198/766 |

Primary Examiner—Robert J. Spar
Assistant Examiner—D. Glenn Dayoan
Attorney, Agent, or Firm—Spencer & Frank

[57] ABSTRACT

A vibratory conveyor includes a trough containing articles to be advanced therein, an oscillating drive operatively connected to the trough for imparting vibrations thereto and a carrier extending along the trough and being connected to the oscillating drive and the trough for transmitting oscillations of the oscillating drive to the trough. The carrier is made of a fiber-reinforced synthetic material.

15 Claims, 2 Drawing Sheets

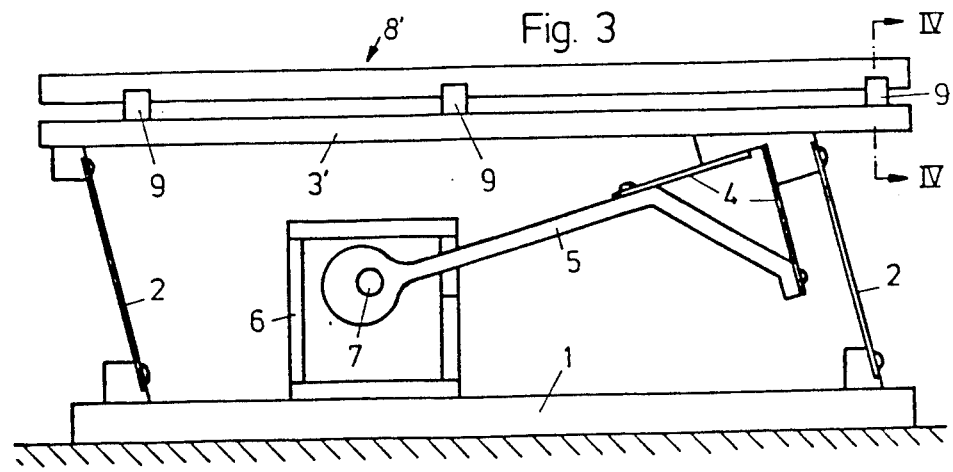
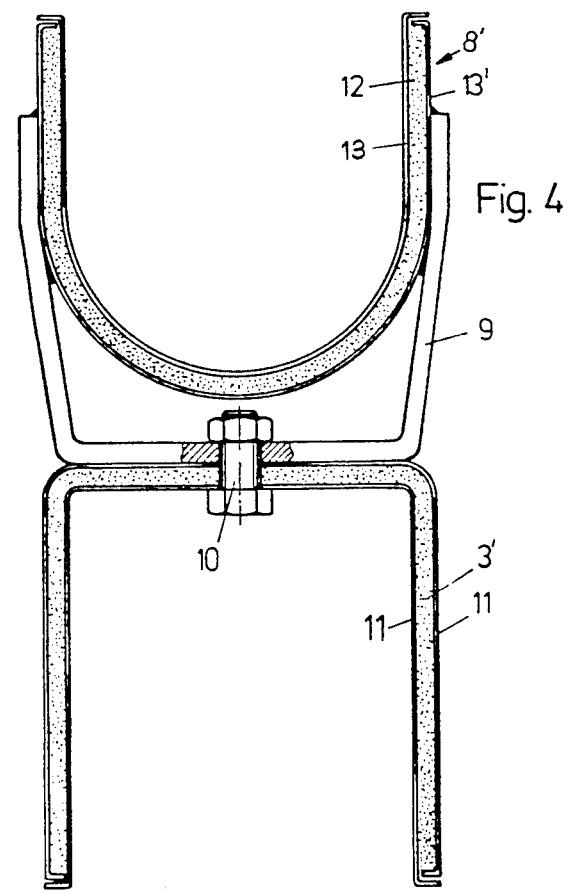

VIBRATORY CONVEYOR

BACKGROUND OF THE INVENTION

This invention relates to a vibratory conveyor for advancing fragile articles such as baked goods. The conveyor apparatus is of the type which has at least one conveyor trough and a drive mechanism for imparting vibration thereto. Such an apparatus is disclosed, for example, in U.S. Pat. No. 4,462,522. The apparatus disclosed therein has conveyor troughs made of stainless steel and is particularly adapted for transporting biscuit-like baked goods (cookies, crackers and the like). It has been found, however, that in the conventional vibratory conveyors the conveying rate at different locations along the trough length is not constant, particularly in case of high outputs.

Extended tests have shown that the non-uniformity in the conveying rate (output) is caused by the bending oscillations of the conveyor troughs. Such bending oscillations are superposed on the combined horizontal and vertical vibrations which are imparted to the trough by the oscillating drive. By virtue of such a superposition, the resulting oscillation of the conveyor trough is non-uniform as viewed along the trough length so that the rate of conveyance too, fluctuates as viewed along the trough length.

SUMMARY OF THE INVENTION

It is an object of the invention to provide an improved vibratory conveyor in which the conveyor trough has a largely constant conveying effect along its entire length.

This object and others to become apparent as the specification progresses, are accomplished by the invention, according to which, briefly stated, the vibratory conveyor apparatus has an elongated trough carrier made of a fiber-reinforced synthetic material. The carrier is coupled to the oscillating drive to be vibrated thereby and extends along and is secured to the conveyor trough in a manner to transmit thereto the oscillations of the drive.

Fiber-reinforced synthetic materials have a significantly higher specific modulus of elasticity ($E/\rho$) than stainless steel. By making the trough carrier of a fiber-reinforced synthetic material according to the invention, there can therefore be obtained a significantly higher natural (own) bending frequency. Consequently, in the frequency range utilized in this environment, the bending oscillations of the conveying trough are eliminated, whereby a constant conveying effect along the entire trough length is achieved. For the same bending strength the total mass of the vibrated components is significantly less than in conventional constructions. As a result, the reaction forces on the oscillating drive are also greatly reduced. This is of particular significance for a drive comprising a crankshaft as disclosed, for example, in the earlier-noted U.S. Pat. No. 4,462,522. Despite the inherent advantages of a crank drive (constant stroke) it could not find widespread application because of the significant amount of wear to which the crank bearings have been exposed. This disadvantage is eliminated by the invention inasmuch as the forces applied to the bearing are significantly lowered by virtue of the substantial reduction of the masses to be moved.

In the manufacture of baked goods on an industrial scale the problem of conveying batches of differently shaped products is often encountered. The construction according to the invention may find solution to this problem because the significantly lighter carrier makes it possible to install on the carrier a lightweight conveyor trough in a readily replaceable manner. The conveyor trough itself may be made of a body of a fiber-reinforced synthetic material, lined, for example, with a stainless steel shell constituting the conveyor trough proper.

BRIEF DESCRIPTION OF THE DRAWING

FIG. 3 is a schematic side elevational view of a vibratory conveyor according to a further preferred embodiment of the invention.

FIG. 4 is an enlarged sectional view taken along line IV—IV of FIG. 3.

DESCRIPTION OF THE PREFERRED EMBODIMENTS

Figure 1:
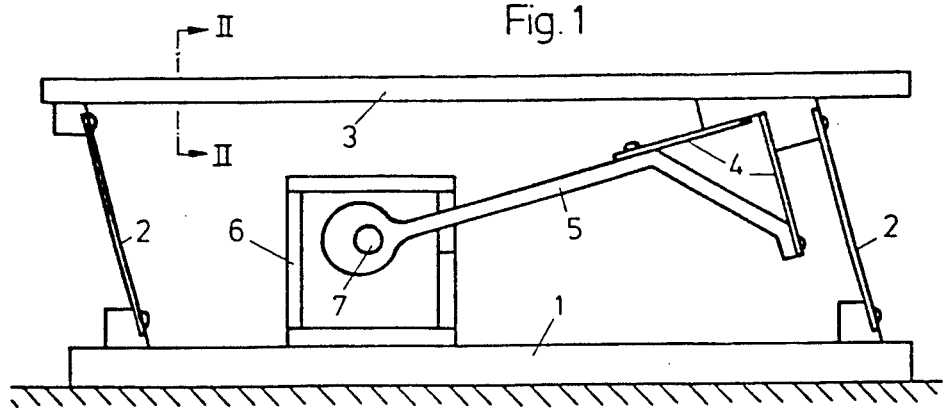
FIG. 1 is a schematic side elevational view of a vibratory conveyor according to a preferred embodiment of the invention.
Figure 2:
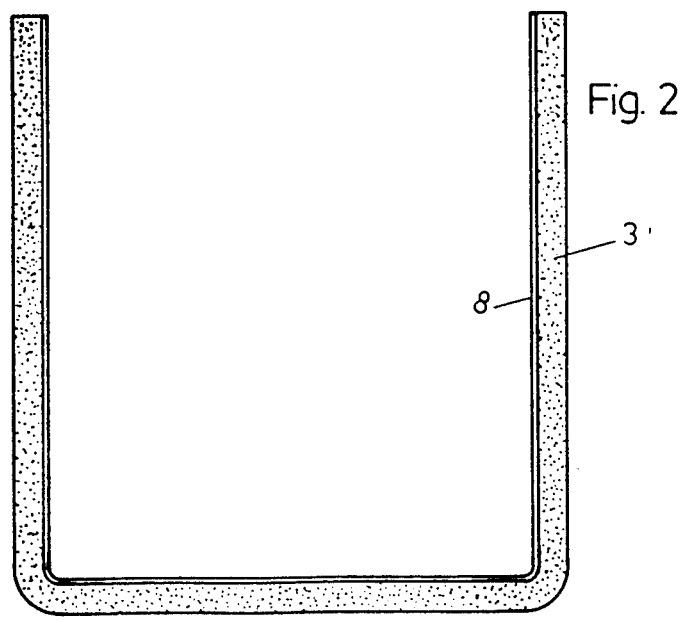
FIG. 2 is an enlarged sectional view taken along line II—II of FIG. 1.

Turning now to the embodiment illustrated in FIGS. 1 and 2, the vibratory conveyor shown therein has a horizontal base plate 1, to the opposite ends of which there are secured two parallel-oriented inclined leaf springs 2. The springs 2 are fixedly connected with a trough carrier 3 extending above and parallel to the base plate 1. Adjacent one end of the trough carrier 3 there is secured thereto, by means of two perpendicularly arranged further leaf springs 4, a push rod 5 driven by a crankshaft 7 rotatably supported in a housing 6. A plurality of trough carriers 3 may be arranged side-by-side in a parallel-extending relationship to one another and driven by the same crankshaft 7, in which case expediently the individual cranks, similarly to a piston-type internal combustion engine, are angularly offset, whereby the moved masses are balanced. As illustrated in FIG. 2, the trough carrier 3 is of U-shaped cross section and is, according to the invention, made of a synthetic material reinforced with a carbon fiber. The synthetic material may be a thermosetting plastic. Particularly suitable are epoxy resin and phenolic resin. The fiber content of the material is expediently as high as possible. In case of a unidirectional orientation of the fibers, the fiber content can be as high as 70% by total weight of the plastic/fiber mixture. For a further increase of the specific modulus of elasticity, the individual fibers are capillary fibers. The inner face of the trough carrier 3 is lined with a shell 8 which constitutes the conveying trough proper and is made of stainless steel or a wear-resistant synthetic material, such as polyurethane. The carrier 3 and the shell together constitute a trough assembly, wherein the carrier 3 serves as the supporting trough body and the shell 8 provides the conveying surface. The shell or lining 8 is not necessarily limited to the inner face of the carrier 3: it may continue on the other surface thereof. In this manner the trough carrier 3 is protected on all sides and may be cleaned while taking into consideration all hygienic requirements. The trough cross section generally corresponds to the articles to be conveyed. In case such articles have a circular configuration and are to be conveyed in an edgewise orientation to form a lying stack, the base of the U has an outwardly extending semicircular cross-sectional configuration as illustrated in FIG. 4.

The embodiment illustrated in FIGS. 3 and 4 is designed particularly for an apparatus that has to be adapted to various shapes of the articles to be conveyed. In conventional conveyor apparatus time-consuming installation work has been necessary to switch to the conveyance of a different type of article.

In the embodiment shown in FIGS. 3 and 4 the carrier 3' is a beam of inverted U-shaped cross section and forms, with the two leaf springs 2 and the base plate 1 a vibratory parallelogram similarly to the FIG. 1 embodiment. The crankshaft 7 vibrates, with the intermediary of the actuating rod push rod) 5 and the leaf springs 4 the carrier beam 3'. A conveyor trough assembly generally designated at 8' is supported on the carrier beam 3'. The trough assembly 8' is readily replaceably mounted on the carrier 3' by yokes 9 which are rigidly affixed (for example, by welding) to the external face of the trough assembly 8' and are secured to the carrier beam 3' by central bolts 10 (only one shown). For replacing the trough assembly 8' to adapt it to a different type of article to be conveyed, the bolts 10 are removed and a new trough is installed.

The yokes 9 are distributed along the length of the trough assembly 8' in a non-uniform manner to dampen upper harmonics in addition to the basic oscillation. Expediently, the trough assembly 8' and the carrier beam 3' have different natural frequencies.

The carrier beam 3' is of a synthetic material reinforced by a carbon fiber and has an inner and an outer lining 11 made of stainless steel. Expediently, the trough assembly 8' is of lightweight construction. For this purpose, and also to further the principal object of the invention, the trough assembly 8' has a main trough body 12 constituted of a carbon fiber-reinforced synthetic material. The trough proper of the trough assembly 8' is formed of a shell 13. The trough body 12 is covered externally by an outer shell 13'. Shells 13 and 13' may be made of stainless steel or a wear-resistant synthetic material, such as polyurethane.

The material for the carrier beam 3' and the trough body 12 may be the same as the material of the carrier 3 of the first embodiment described in connection with FIGS. 1 and 2.

It will be understood that the above description of the present invention is susceptible to various modifications, changes and adaptations, and the same are intended to be comprehended within the meaning and range of equivalents of the appended claims.

What is claimed is:

1. In a vibratory conveyor including a trough containing articles to be advanced therein; and an oscillating drive means operatively connected to said trough for imparting vibrations thereto for advancing the articles; the improvement comprising a trough body forming a carrier extending along said trough and being connected to said oscillating drive means and said trough for transmitting oscillations of said oscillating drive means to said trough; said carrier being of a fiber-reinforced synthetic material, and said trough being constituted by a shell lining said trough body.

2. A vibratory conveyor as defined in claim 1, wherein the fibers reinforcing the synthetic material are capillaries.

3. A vibratory conveyor as defined in claim 1, wherein the fibers reinforcing the synthetic material are carbon fibers.

4. A vibratory conveyor as defined in claim 1, wherein said shell is metal.

5. A vibratory conveyor as defined in claim 4, wherein said metal is stainless steel.

6. A vibratory conveyor as defined in claim 1, wherein said shell is a synthetic material.

7. A vibratory conveyor as defined in claim 6, wherein said synthetic material is polyurethane.

8. In a vibratory conveyor including a trough containing articles to be advanced therein; and an oscillating drive means operatively connected to said trough for imparting vibrations thereto for advancing the articles; the improvement comprising a carrier beam extending along said trough and being connected to said oscillating drive means and said trough for transmitting oscillations of said oscillating drive means to said trough; and a plurality of holding means for readily releasably attaching said trough to said carrier beam; said carrier beam being of a fiber-reinforced synthetic material.

9. A vibratory conveyor as defined in claim 8, wherein said trough is spaced from said carrier beam by said holding means.

10. A vibratory conveyor as defined in claim 8, wherein said trough is formed of a trough body and a shell lining said trough body; said trough body being of a fiber-reinforced synthetic material.

11. A vibratory conveyor as defined in claim 10, wherein said shell is a synthetic material.

12. A vibratory conveyor as defined in claim 11, wherein said synthetic material is polyurethane.

13. A vibratory conveyor as defined in claim 10, wherein said shell is metal.

14. A vibratory conveyor as defined in claim 8, wherein the fibers reinforcing the synthetic material are capillaries.

15. A vibratory conveyor as defined in claim 8, wherein the fibers reinforcing the synthetic material are carbon fibers.

* * * * *